United States Patent
Ravindranath et al.

(10) Patent No.: US 10,397,183 B2
(45) Date of Patent: Aug. 27, 2019

(54) METHOD AND SYSTEM FOR ENABLING MEDIA OPTIMIZATION IN A CLOUD CONFERENCE

(71) Applicant: Cisco Technology, Inc., San Jose, CA (US)

(72) Inventors: Ram Mohan Ravindranath, Bangalore (IN); Faisal Siyavudeen, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 15/347,832

(22) Filed: Nov. 10, 2016

(65) Prior Publication Data

US 2018/0131672 A1    May 10, 2018

(51) Int. Cl.
*H04L 29/06* (2006.01)
*H04L 29/12* (2006.01)
*H04L 29/08* (2006.01)

(52) U.S. Cl.
CPC ........ *H04L 61/2589* (2013.01); *H04L 61/255* (2013.01); *H04L 61/2514* (2013.01); *H04L 65/1069* (2013.01); *H04L 65/403* (2013.01); *H04L 65/80* (2013.01); *H04L 67/146* (2013.01)

(58) Field of Classification Search
CPC . H04L 61/2589; H04L 65/80; H04L 65/1069; H04L 61/2514; H04L 61/255; H04L 65/403; H04L 67/146
See application file for complete search history.

(56) References Cited

U.S. PATENT DOCUMENTS

| | | | | |
|---|---|---|---|---|
| 7,221,961 | B1* | 5/2007 | Fukumoto | G06F 1/1616 455/41.2 |
| 2006/0126596 | A1* | 6/2006 | Shieh | H04L 29/06027 370/352 |
| 2006/0212576 | A1 | 9/2006 | Barkley et al. | |

(Continued)

OTHER PUBLICATIONS

Microsoft; Multiplexed Turn Session ID (Jul. 6, 2016) Can be seen at: https://msdn.microsoft.com/en-us/library/mt757372(v=office 12).aspx.

(Continued)

*Primary Examiner* — Michael A Keller
(74) *Attorney, Agent, or Firm* — Merchant & Gould P.C.

(57) ABSTRACT

An example method is provided and includes receiving a relay address allocation request from an endpoint, the relay address allocation request comprises a unique session identifier that identifies a conference session joined by the endpoint for media streaming; determining a relay candidate comprising a relay transport address for allocating to each endpoint of the conference session having the unique session identifier. Further, the method includes mapping the relay candidate with the unique session identifier and sending a relay address allocation response that comprises at least the relay candidate mapped with the unique session identifier. The method further includes receiving a single copy of one or more media stream packets from the conference controller and relaying the one or more media stream packets via the relay transport address identified by the unique session identifier to each of the one or more endpoints in the session having the unique session identifier.

19 Claims, 9 Drawing Sheets

(56) References Cited

U.S. PATENT DOCUMENTS

| | | | |
|---|---|---|---|
| 2007/0171274 | A1 | 7/2007 | Yim |
| 2009/0215438 | A1* | 8/2009 | Mittal ............... H04M 3/42195 |
| | | | 455/418 |
| 2011/0310886 | A1* | 12/2011 | Chaturvedi ............ H04L 63/08 |
| | | | 370/352 |
| 2012/0002665 | A1 | 1/2012 | Kimura |
| 2014/0226664 | A1* | 8/2014 | Chen ................... H04L 61/2589 |
| | | | 370/392 |
| 2014/0359004 | A1 | 12/2014 | Zhou |
| 2016/0065476 | A1 | 3/2016 | Reddy et al. |
| 2016/0099890 | A1* | 4/2016 | Kaufman ............ H04L 61/2575 |
| | | | 709/203 |
| 2016/0191461 | A1* | 6/2016 | Wang ................... H04L 65/103 |
| | | | 709/227 |
| 2017/0295475 | A1* | 10/2017 | Patel ....................... H04W 4/10 |

OTHER PUBLICATIONS

Microsoft; Receiving Allocate Request Messages (2016) Can be seen at: https://msdn.microsoft.com/en-us/library/dd949945(d=printer,v=office.12).aspx.

Petit-Huguenin, M. et al.; Path MTU Discovery Using Session Traversal Utilities for NAT STUN, Draft-IETF-TRAM-STUN-PMTUD-03 (Oct. 27, 2016).

Burman, B. et al., Using Simulcast IN—bSDP and RTP Sessions, DRAFT-IETF-MMUSIC-SDP-Simulcast-06 (Oct. 31, 2016).

Martinsen, P. et al.: Traversal Using Relays Around NAT (TURN) Bandwidth Probe, DRAFT-Martinsen-TRAM-Turnbandwidthprobe-00 (May 26, 2015).

Patil, P. et al.; TURN Server Auto Discovery, Draft-IETF-TRAM-TURN-Server-Discovery-10 (Oct. 5, 2016).

Martinsen, P. et al.; Measurement of Round Trip Time and Fractional Loss Using STUN, DRAFT-IETF-TRAM-STUN-Path-Data-05 (Aug. 23, 2016).

Johnston, A. et al.; Session Initiation Protocol (SIP), Call Control—Conferencing for User Agents (Aug. 2006)—RFC 4579.

Mahy, R. et al.; Traversal Using Relays Around NAT (TURN): Relay Extensions to Session Traversal Utilities for NAT (STUN) (Apr. 2010)—RFC 5766.

* cited by examiner

METHOD AND SYSTEM FOR ENABLING MEDIA OPTIMIZATION IN A CLOUD CONFERENCE

TECHNICAL FIELD OF THE DISCLOSURE

The present disclosure generally relates to media optimization, and more particularly, but not exclusively to a method and a system for enabling media optimization in a cloud conference call solution.

BACKGROUND

Traditionally, cloud conference systems have a conference mixer or conference switcher that would stream media to all participants of the conference. For privacy and security reasons, the cloud conference mixer and the participants may likely be behind a Network Address Translator (NAT) device or firewall. Generally, when both the participants and conference mixer are behind NAT devices, Traversal Using Relays around NAT (TURN) servers are used to send and receive media through browser-based applications. Web Real-Time Communication (WebRTC) is a technology that enables browser-based applications to support audio or video media streaming between participants behind the NAT device. WebRTC uses TURN servers for relaying media or data when the participants are behind a NAT device or firewall.

BRIEF DESCRIPTION OF THE DRAWINGS

The accompanying drawings, which are incorporated in and constitute a part of this disclosure, illustrate exemplary embodiments and, together with the description, explains the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
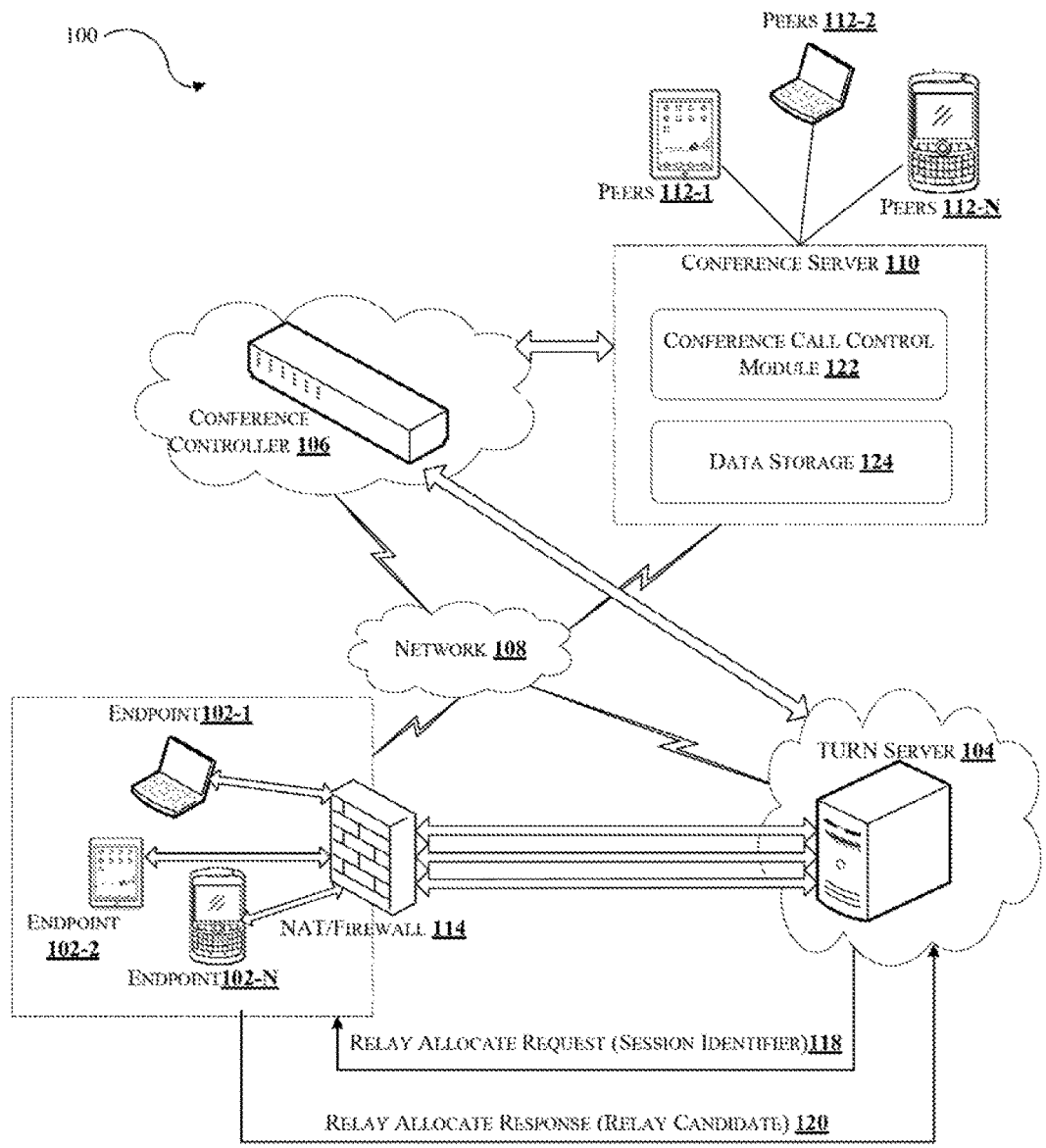
FIG. 1a is a simplified schematic diagram of a cloud conference system enabling media optimization between conference controller, TURN server and endpoints in accordance with some embodiments of the present disclosure.

It should be appreciated by those skilled in the art that any block diagrams herein represent conceptual views of illustrative systems embodying the principles of the present subject matter.

DETAILED DESCRIPTION OF EXAMPLE EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the form disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

OVERVIEW

An endpoint is provided in one example embodiment, wherein the endpoint is operable with a network device and a conference controller. The endpoint comprises a processor and a memory communicatively coupled to the processor, wherein the memory stores processor-executable instructions, which, on execution, cause the processor to send a relay address allocation request to the network device. The relay address allocation request comprises a unique session identifier that identifies a conference session joined by the endpoint for media streaming. The endpoint further receives a relay address allocation response from the network device in response to sending the relay address allocation request. The relay address allocation response comprises at least a relay candidate that includes a relay transport address allocated to the endpoint and is mapped with the unique session identifier. The endpoint further sends a session offer message to the conference controller, wherein the session offer message comprises at least the relay transport address to be used as a destination address for the endpoint. During the exchange of packets, the endpoint receives one or more media stream packets relayed from the network device via the destination address identified by the unique session identifier.

In another example embodiment, the present disclosure relates to a network device operable with one or more endpoints and a conference controller, and a method performed by the network device. The network device comprises a processor and a memory communicatively coupled to the processor, wherein the memory stores processor-executable instructions, which, on execution, cause the processor to receive a relay address allocation request from an endpoint of the one or more endpoints. The relay address allocation request comprises a unique session identifier that identifies a conference session joined by the endpoint for media streaming. The network device determines a relay candidate comprising a relay transport address for allocating to each of the one or more endpoints of the conference session having the unique session identifier. Further, the network device maps the relay candidate with the unique session identifier and sends a relay address allocation response to the one or more endpoints. The relay address allocation response comprises at least the relay candidate mapped with the unique session identifier. During the exchange of packets, the network device receives a single copy of one or more media stream packets from the conference controller and relays the one or more media stream packets via the relay transport address identified by the unique session identifier to each of the one or more endpoints in the session having the unique session identifier.

The present disclosure relates to a method and a system for enabling media optimization for a media session using relay service. A relay service provides access for communicating data traffic and/or media traffic among network devices such as symmetric Network Address Translation (NAT) device. Relay service may include, but are not limited to, a relay connection or a relay address on a relay server. In one embodiment, the network device such as a Traversal Using Relays around NAT (TURN) server is configured to establish a relay service for a media session such as Web Real-Time Communication (WebRTC) media session or Session Initiation Protocol (SIP) session with one or more endpoints participating in the session, to optimize media streaming received from conference mixer and to relay the received media packets to each of the endpoints participating in the session. By having a single stream of media packets, the need to have multiple streams to each endpoint is avoided resulting in reduction of the bandwidth usage for media streaming. Further, by way of single streaming of media packets, the conference mixer or the conference controller can scale up with more endpoints participating in the media session without having additional instances of the conference mixer thereby avoiding additional cost and increased delay involved therein.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

EXAMPLE EMBODIMENTS

Generally, scaling up a conference solution to accommodate more participants of an enterprise is achieved by increasing the number of conference mixer. However, this leads to additional cost for each additional instance of the conference mixer. Also, this may lead to increase in latency or delay in media streaming as there would be multiple conference mixers involved and hence multiple media hops. Further, if the access link between the conference cloud and the participants has bandwidth issues, the quality of the media streaming experience will be poor for the participants of the conference. Accordingly, it would be desirable to provide a method and system for enabling media optimization to improve the scaling up of the conference solution and improving the quality of media streaming in low bandwidth conditions.

FIG. 1a is a simplified schematic diagram of a cloud conference system enabling media optimization in a conference session participated in by a conference controller, TURN server and endpoints in accordance with embodiments of the present disclosure. As shown in FIG. 1a, the cloud conference system 100 includes one or more components such as one or more endpoints 102-1, 102-2, . . . 102-N) (hereinafter collectively referred to as endpoints 102), a network device such as a Traversal Using Relay around NAT (TURN) server 104, and a conference controller (alternatively referred to as conference mixer or conference media switch) 106 connected via a communication network 108. The cloud conference system 100 further includes a conference server 110 coupled with the conference controller 106 and one or more target end points 112-1, 112-2 . . . 112-N (hereinafter collectively referred to as peers 112).

The endpoints 102 may be personal computers (PC), conference servers, tablet computers, Voice-Over-Internet Protocol (VoIP) phones, or smartphones that include one or more web based application program interfaces (APIs) that handle web based applications. In general, an endpoint 102 may be any device that initiates or participates in a communication or data exchange within a communication system. Data, as used herein in this document, refers to any type of voice and audio, audio-visual, or any other suitable data/information in any appropriate format that may be communicated from one point to another. Further, an endpoint 102 typically comprises a browser application (for example, Mozilla Firefox®, Google Chrome®, Microsoft Internet Explorer®, or Apple Safari®) that allow a user of the endpoints 102 to interact with the web based application. In some cases, the browser of the endpoints 102 is configured to support WebRTC communication and exchange media packets over the communication channel. The endpoints 102 may alternatively be referred to as a TURN client. In another embodiment, the endpoints 102 may comprise previously installed plug-in software, for example Polycom's PVX software for Windows based PCs, WebEx by CISCO, and X-Meeting for the Mac that enable TURN clients to act as video conferencing endpoints. Endpoints 102 are typically behind a symmetric NAT/firewall device 114. Media packets from the endpoints 102 are relayed to the peers 112 coupled with the conference mixer 106 through the TURN server 104. Likewise, the media packets from the peers 112 is delivered to the TURN server 104 over the media channel and relayed to the endpoints 102. In this way, both the endpoints 102 and the peers 112 can participate in communications such as video calls, video chats, peer-to-peer file sharing, audio calls, audio chats, instant messaging and so on. In another example, the endpoints 102 may be Session Initiation Protocol (SIP) deployed endpoints or SIP gateways or any SIP server that does SIP signaling and handles media.

The peers 112 are operable to exchange media packets with the endpoints 102. In one example, the peers 112 may be mobile devices such as a smart phone, a tablet etc., that communicate through an IP multimedia system (IMS), the conference switch and that do not support WebRTC. If the peers 112 do not support WebRTC communication, then a WebRTC gateway (not shown) is utilized to decode the media stream received from the endpoints 102. The WebRTC gateway is also configured to provide the signaling for facilitating the media session and the communication between the endpoints 102 and the peers 112. In one example, the WebRTC gateway includes a signaling server (not shown) and a media server. The signaling server is configured to handle a transport protocol (e.g., Hyper Text Transfer Protocol Secured (HTTPS) and a signaling protocol (e.g. Session Initiation Protocol (SIP)). The media server is configured to provide the media stream to the endpoints 102 and to the peers 112. In one embodiment, the media server comprises the TURN server 104 integrated within to support NAT/firewall traversal that require relay services. For example, if the endpoints 102 are behind a symmetric NAT device or restrictive firewall that blocks UDP transmission, then the endpoints 102 use the relay service from the TURN server 104 to communicate with the peers 112. In another embodiment, the TURN server 104 may not be incorporated within the media server, instead may be implemented as an independent device or within any other suitable network device.

The TURN server 104 may comprise a network device that can facilitate communication with the endpoints 102 via the network 108. In one embodiment, the TURN server 104 may be a cloud based SaaS (Software as a Service) device operable with a conference cloud provider for a media session. In another example, the TURN server 104 may comprise a router, gateway, bridge, processor, server, switch or any other element that is operable to manage, direct, route, switch or otherwise affect one or more packets of information that propagate in the network. To initiate the communication, the endpoints 102 uses a TURN discovery mechanism to discover the TURN server 104 based on the network associated with the endpoints 102. In one embodiment, the endpoints 102 that require relay services of the TURN server 104 send a TURN allocate request 118 to a nearest network interface having a predetermined anycast address. The TURN server 104 identifies a relay transport address for allocating to the endpoints 102 and sends a corresponding response to the relay allocate request 120 via the network 108. The network 108 may include, without limitation, a direct interconnection, local area network (LAN), wide area network (WAN), wireless network (e.g., using Wireless Application Protocol), the Internet, etc.

Figure 1B:
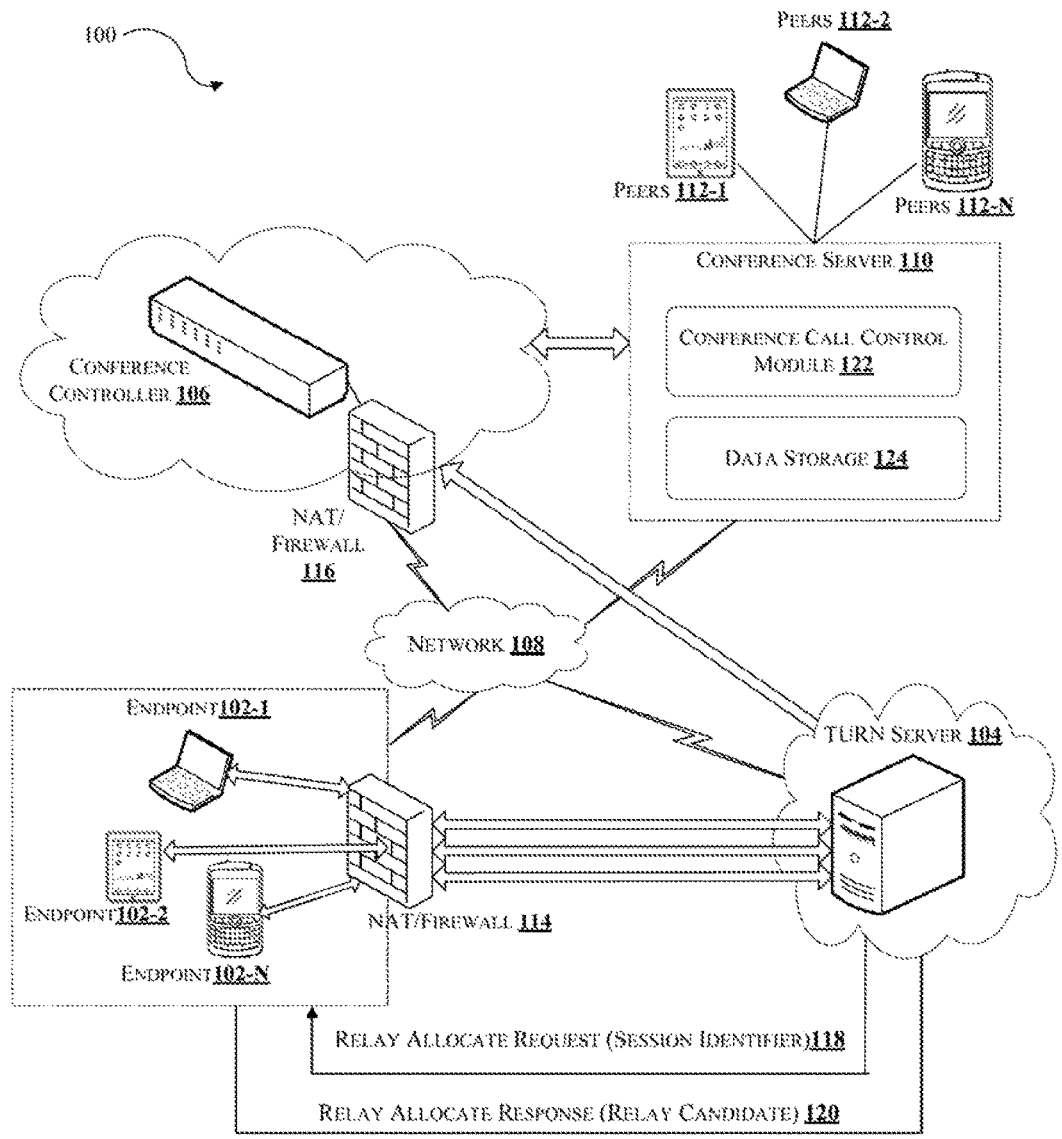
FIG. 1b is a simplified schematic diagram of a cloud conference system enabling media optimization between conference controller behind NAT, TURN server and endpoints in accordance with some embodiments of the present disclosure.

The conference controller 106 is coupled with the conference server 110 and configured to establish a conference call set up in a cloud conference. The conference controller 106 is also configured to encode and decode media data coming in to and going out of the conference server 110. In one embodiment, the conference controller 106 may be implemented to stream media packets from the peers 112 to the endpoints 102. The conference server 110 sends instructions to the endpoints 102 joining a conference to dynamically use the TURN server 104 to enable more number of endpoints 102 to participate and join the conference call. For example, if the conference server 110 is serving a media session that has many peers 112 and endpoints 102 joining in globally, the conference controller 106 will dynamically decide, based on the corresponding resource load, that the conference controller 106 may not be able to handle the resource load and then tries to group participants joining in from a same location to use a single TURN relay server 104. Alternatively, if both the peers 112 and the endpoints 102 are behind a NAT device, the conference server 110 sends instructions to the endpoints 102 to use the TURN server 104. Further, as illustrated in FIG. 1b, the conference controller or the conference switch 106 is behind a symmetric NAT/Firewall device 116 and is configured to stream media packets from the peers 112 to the TURN server 104 for relaying to the endpoints 102 in the session handled by the conference server 110.

In one embodiment, the conference server 110 comprises the conference controller 106, a memory, a conference call control module 122 and data storage 124. The conference call control module 122 may be a soft switch configured to set up call connections between the endpoints 102 and the peers 112 as well as the conference server 110. The data storage 124 enables storing of all data associated with conference call, media data and data associated with other modules in the conference server 110. In another embodiment, the conference controller 106 may be implemented as an independent device of the conference server 110 or within any other suitable network device.

In operation, the endpoints 102 are invited to participate in the media session by means of invitation (for example, WebEx meeting request) and informed of the conference identifier (or conference passcode). In another embodiment, the endpoints 112 are invited to participate in the media session by SIP request as defined in RFC4579. To establish a media session using any one of a WebRTC or Session Initiation Protocol (SIP) session with peers 112, the endpoints 102 identify the TURN server 104 using TURN discovery mechanisms. In another embodiment, the conference server 110 sends details of the TURN server 104 that the endpoints 102 in a region should use. For example, if the conference server 110 determines that there are greater number of endpoints 102 joining the media session from a particular region and the bandwidth available is not sufficient to handle the media session, then the conference server 110 groups the endpoints 102 to use a particular relay server to optimally use the available bandwidth. Upon selecting the TURN server 104, the endpoints 102 send a relay address allocate request (ALLOCATE) 118 comprising one or more attributes as defined in RFC5766. In one embodiment, the ALLOCATE request 118 comprises a new attribute SESSION-IDENTIFIER that indicates a unique session identifier. The unique session identifier is the conference identifier that enables identification of the conference session joined by the endpoints 102 and the peers 112. In response to receiving the ALLOCATE request, the TURN server 104 sends a relay address allocation response (ALLOCATE RESPONSE) message that comprises a relay candidate allocated to the endpoints 102. The relay candidate comprises a relay transport address of the TURN server 104 that is used for relaying the media stream packets to the endpoints 102 and for receiving the media stream packets from the conference controller 106 sent by the peers 112.

Figure 2:
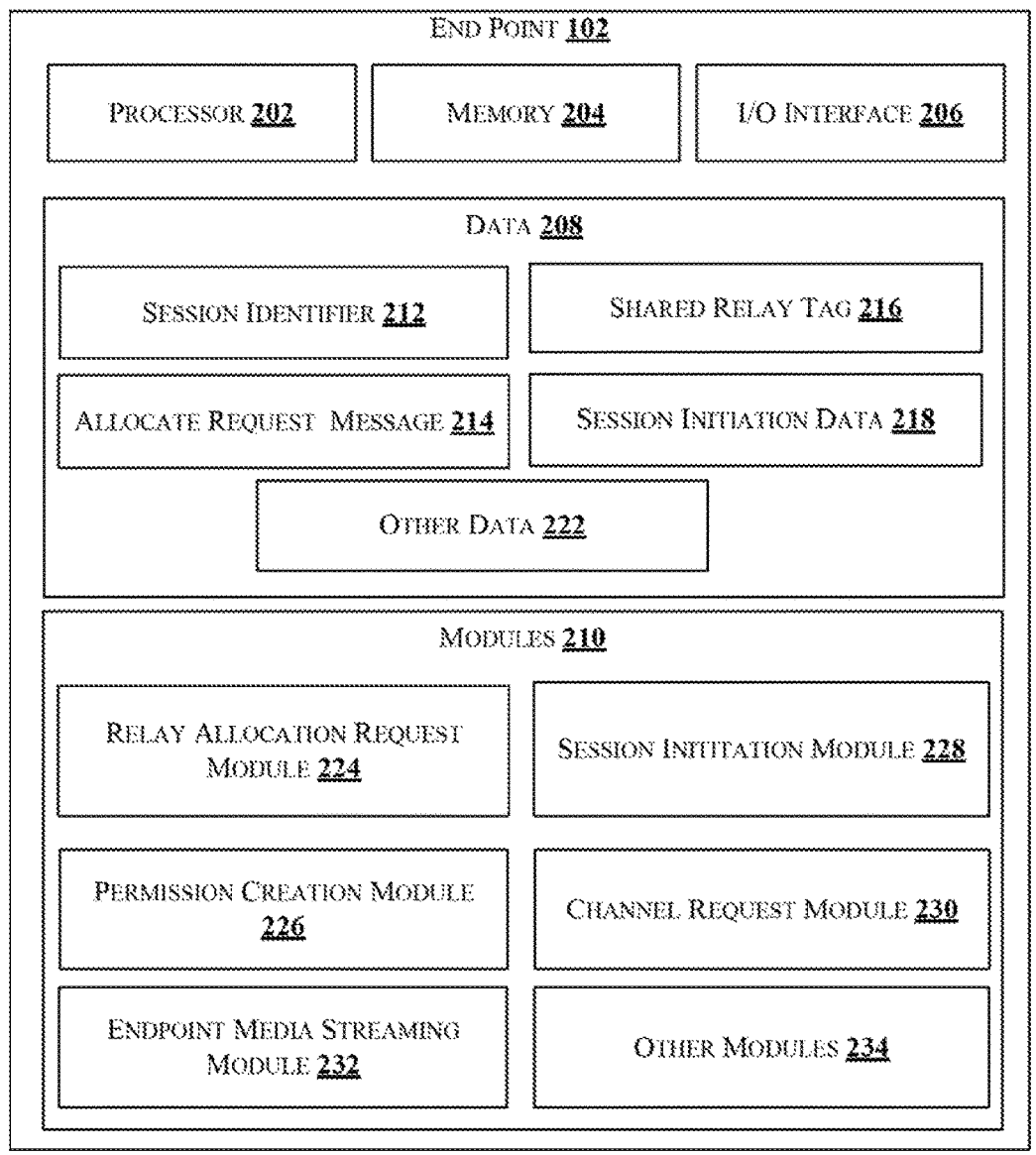
FIG. 2 is a simplified schematic diagram illustrating an exemplary block diagram of an endpoint of FIGS. 1a and 1b in accordance with some embodiments of the present disclosure.

The endpoints 102 may be TURN clients as illustrated in FIG. 2. Each of the endpoints 102 comprises a processor 202, a memory 204, and an I/O interface 206. The I/O interface 206 is coupled with the processor 202 and an I/O device. The I/O device is configured to receive inputs via the I/O interface 206 and transmit outputs for displaying in the I/O device via the I/O interface 206. Each endpoint 102 further comprises data 208 and modules 210. In one implementation, the data 208 and the modules 210 may be stored within the memory 204. In one example, the data 208 may include session identifier 212, one or more ALLOCATE request messages 214, shared relay tag 216, session initiation data 218, channel information 220 and other data 222. In one embodiment, the data 208 may be stored in the memory 204 in the form of various data structures. Additionally, the data can be organized using data models, such as relational or hierarchical data models. The other data 222 may also be referred to as a reference repository for storing recommended implementation approaches as reference data. The other data 222 may also comprise data, including temporary data and temporary files, generated by the modules 210 for performing the various functions of the endpoints 102.

The modules 210 may include, for example, a relay allocation request module 224, a permission creation module 226, a session initiation module 228, a channel request module 230, and an endpoints media streaming module 232. The modules 210 may also comprise other modules 234 to perform various miscellaneous functions of the endpoints 102. It will be appreciated that such modules may be represented as a single module or a combination of different modules. The modules 210 may be implemented in the form of software, hardware and/or firmware.

Figure 3:
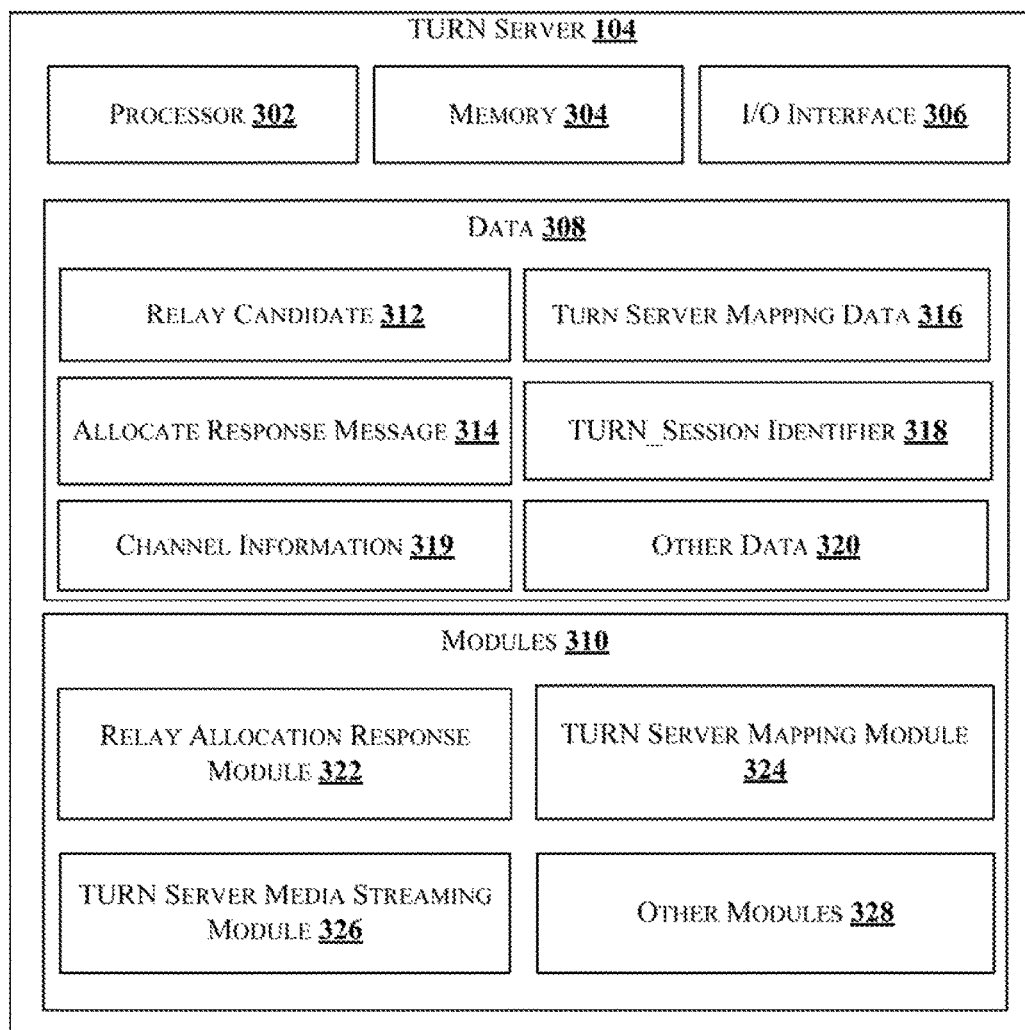
FIG. 3 is a simplified schematic diagram illustrating an exemplary block diagram of a TURN server of FIGS. 1a and 1b in accordance with some embodiments of the present disclosure.

As illustrated in FIG. 3, the TURN server 104 may be a relay server and comprises a processor 302, a memory 304, and an I/O interface 306. The I/O interface 306 is coupled with the processor 302 and an I/O device. The I/O device is configured to receive inputs via the I/O interface 306 and transmit outputs for displaying in the I/O device via the I/O interface 306. The TURN server 104 further comprises data 308 and modules 310. In one implementation, the data 308 and the modules 310 may be stored within the memory 304. In one example, the data 308 may include a relay candidate 312, one or more ALLOCATE RESPONSE messages 314, TURN server mapping data 316, TURN session identifier 318, channel information 319 and other data 320. In one embodiment, the other data 320 may be stored in the memory 304 in the form of various data structures. Additionally, the aforementioned data can be organized using data models, such as relational or hierarchical data models. The other data 320 may be also referred to as a reference repository for storing recommended implementation approaches as reference data. The other data 320 may also comprise data, including temporary data and temporary files, generated by the modules 310 for performing the various functions of the TURN server 104.

The modules 310 may include, for example, a relay allocation response module 322, a TURN server mapping module 324, and a TURN server media streaming module 326. The modules 310 may also comprise other modules 328 to perform various miscellaneous functions of the TURN server 104. It will be appreciated that such aforementioned modules may be represented as a single module or a combination of different modules. The modules 310 may be implemented in the form of software, hardware and/or firmware.

Figure 4:
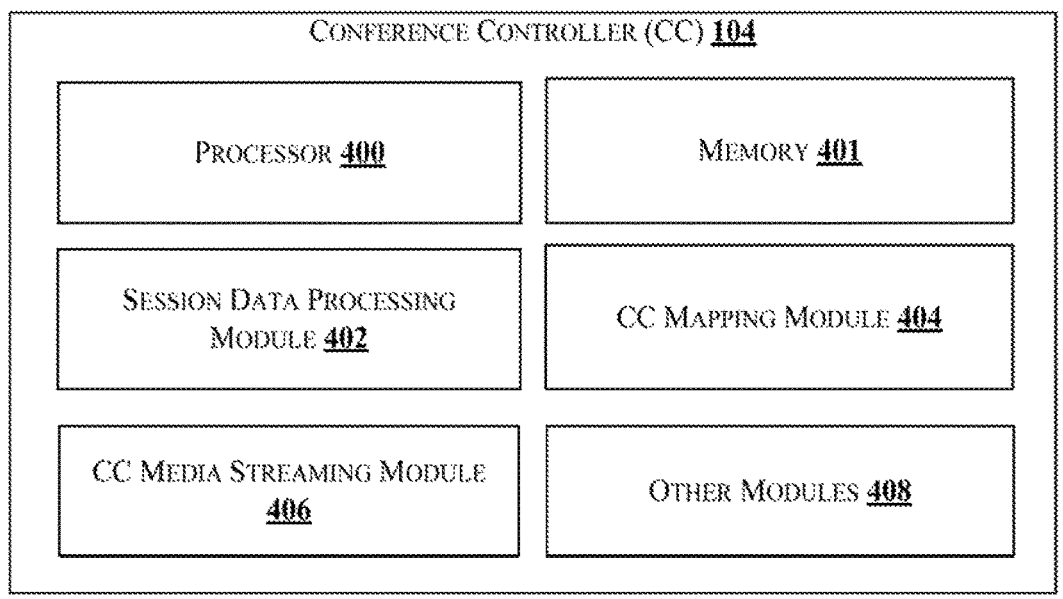
FIG. 4 is a simplified schematic diagram illustrating an exemplary block diagram of a conference controller of FIGS. 1a and 1b in accordance with some embodiments of the present disclosure.

The conference controller (CC) 106 may be a conference switch or mixer. As illustrated in FIG. 4, the conference controller 106 comprises at least a processor 400, a memory 401, a session data processing module 402, a CC Mapping module 404, a CC media streaming module 406 and other modules 408. The other modules 408 perform various miscellaneous functions of the conference controller 106. It will be appreciated that such aforementioned modules may be represented as a single module or a combination of different modules.

In operation, an endpoint 102 initiates call setup operations with the conference server 110. The endpoint 102 behind a NAT device identifies the TURN server 104 using TURN discovery mechanisms. In one embodiment, the endpoint 102 sends a TURN discovery request to the TURN server 104 and redirects the TURN discovery request to another alternate TURN server if the endpoint 102 receives an ALTERNATE-SERVER response from the TURN server 104. The TURN discovery request may comprise at least one or more attributes including STUN-pMTUD, TRAM-BW, STUN-PATH-CHARACTERISTICS. Once the endpoint 102 selects the appropriate TURN server 104, the endpoint 102 sends a relay allocate request message 214 to the TURN server 104.

Figure 5A:
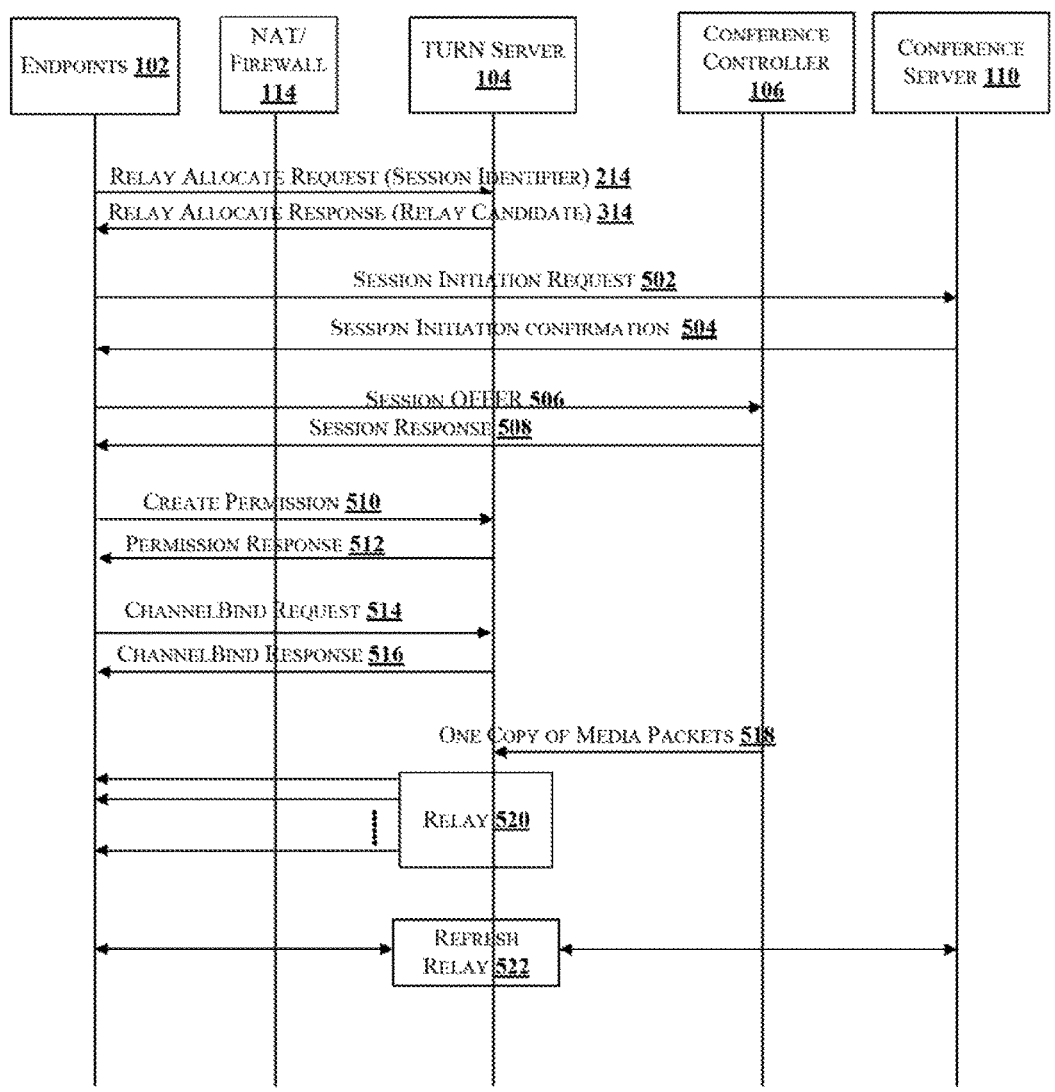
FIG. 5a is a simplified protocol diagram of an embodiment of media optimization in the cloud conference system in accordance with some embodiment of the present disclosure.

As illustrated in FIG. 5a, the relay allocation request module 224 sends the relay allocate request message 214 to the TURN server 104. The relay allocate request message comprises one or more attributes as defined in RFC5766 along with a new attribute unique session identifier (SESSION-IDENTIFIER). The new attribute SESSION-IDENTIFIER comprises the conference identifier 212 or the passcode or the unique session identifier that identifies the conference session joined by the endpoint 102. Hereinafter, the SESSION-IDENTIFIER may be alternatively referred to as "conference identifier" or "passcode" or "unique session identifier" having the same meaning in the forthcoming paragraphs throughout the description. The relay allocate request message also comprises a LIFETIME attribute indicating a time-to-expiry value of the relay candidate allocated to the endpoint 102. In one example embodiment, the time-to-expiry value is set to a predetermined value by the endpoint 102. In another example embodiment, the time-to-expiry value is set to a predetermined value by the TURN server 104 upon receiving the relay allocate request message. Further, the endpoint 102 dynamically sends a relay allocation refresh request to the TURN server 104 for refreshing the relay transport address allocated to the endpoint 102 based on the time-to-expiry value.

The TURN server 104 receives the relay allocate request message 214 comprising the unique session identifier 212 and allocates a relay candidate 312 to an endpoint 102 requesting the same. In one embodiment, the relay allocation response module 322 receives the relay allocate request message 214 from the endpoint 102 and determines as to whether any relay candidate allocation already exists for the requested session having the unique session identifier 212 in the new attribute SESSION-IDENTIFIER. In one implementation, if the relay allocation response module 322 determines an existing relay candidate allocation, then the relay allocation response module 322 sends the relay allocate response 314 with the existing relay candidate to the endpoint 102. In another implementation, if the relay allocation response module 322 determines non-allocation for the unique session identifier 212 in the attribute SESSION-IDENTIFIER, then the relay allocation response module 322 determines the relay candidate 312 and transmits the relay allocate response 314 with the relay candidate 312 thus determined. The relay candidate 312 comprises a relay transport address that is used for exchange of media stream packets between the endpoint 102 and the conference controller 106. Exchange of the media stream packets includes both sending the media stream packets to the endpoint 102 as well as receiving the media stream packets from the conference controller 106. In a second embodiment, the TURN server 104 receives the relay allocate request message 214 without the unique session identifier 212. On determination of non-allocation of a relay candidate 312, the relay allocation response module 322 determines the relay candidate 312 and allocates the relay candidate 312 to an endpoint 102 requesting the same. Further, the TURN server 104 receives the time-to-expiry value of the relay transport address allocated to the endpoint 102 in the relay allocate request message. When a relay allocation refresh request is received from the endpoint 102 of the one or more endpoints, the TURN server 104 dynamically refreshes the relay transport address allocated to the endpoint 102 based on the time-to-expiry value received in the relay allocate request message.

The TURN server 104 transmits the relay allocate response message 314 comprising the relay candidate 312 i.e., the relay transport address that may be used for exchanging the media stream packets between the endpoint 102 and the conference controller 106. Upon sending the relay allocation response message 314 to the endpoint 102, the TURN server mapping module 324 maintains a mapping between the relay candidate 312, the unique session identifier 212 and the endpoint 102 allocated with the relay candidate 312, and stores the mapping data as TURN server mapping data 316. For example, if there are 'n' endpoints 102 allocated with a single relay candidate 312 of the same session having the unique session identifier 212, then the TURN server mapping module 324 maintains the mapping between the 'n' endpoints 102 to the same relay candidate 312 and the same unique session identifier 212 and stores the mapping data as TURN server mapping data 316.

Further, as part of the call setup procedures, an endpoint 102 sends a session initiation request 502 to the conference server 110 to initiate a session. In one embodiment, the conference server 110 receives the session initiation request 502 from the endpoint 102 behind the NAT/firewall 114, as illustrated in FIG. 5a. In another embodiment, the conference server 110 is also behind the NAT/firewall 116, and receives the session initiation request 502 from the endpoint 102 behind the NAT/firewall 114. The endpoint 102 uses WebRTC protocol or SIP to initiate the media session between the endpoint 102 and the conference controller 106. The conference server 110 receives the session initiation request 502, creates a new media session in response to receiving the session initiation request 502 and assigns an exemplary unique session identifier to the session thus created. In one example, the unique session identifier 212 may be a conference identifier or passcode that the endpoint 102 knows before initiating the session. In one example, the endpoint 102 may be provided with the conference identifier 212 by means of a WebEx invitation etc. Upon creation of the new media session, the conference server 110 sends a session initiation confirmation message 504 to the endpoint 102. The session initiation confirmation message may comprise validation of the request for creating the media session having the unique session identifier. The endpoint 102 joins the session assigned with the unique session identifier or the conference identifier 212.

The endpoint 102 further continues the call set up procedures by sending a session offer message 506 to the conference controller 106. In one embodiment, the endpoint's session initiation module 228 generates a session offer message 506, for example a Session Description Protocol (SDP) message, comprising one or more attributes including the relay candidate 312 and a new attribute such as SHARED-RELAY tag 216. The session offer message 506 may be stored as session initiation data 218 in the memory 204 of the endpoint 102. A sample session offer message is illustrated below:

A=candidate:750991856 2 udp 22280152 237.03.03.03 51472 typ relay raddr 47.16.16.16 rport 36745 SHARED-RELAY As indicated above, the SHARED-RELAY tag 216 is a unique identification information assigned to each session offer message 506. For example, the SHARED-RELAY tag 216 may be a unique random number etc. The SHARED-RELAY tag 216 indicates that the relay candidate 316 is shared by 'n' endpoints 102 i.e. the 'n' endpoints 102 use the same relay transport address of the relay candidate 316 for exchanging media stream packets with the conference controller 106. Based on the SHARED-RELAY tag in the session offer message 506, the conference controller 106 determines that a relay address is to be used as the destination address for transmission of the media stream packets to the endpoints 102. Also, the SHARED-RELAY tag 216 in the session offer message 506 is an indication to the conference server 110 that the endpoints 102 are grouped to the common TURN server 104 and the media packets must be sent to the TURN server 104 for relaying to the endpoints 102.

The conference controller 106 receives at least one session offer message 506 that comprises the unique session identifier 212, the relay candidate 312 and the unique SHARED-RELAY tag 216. Upon receiving the session offer message 506, the conference controller 106 processes the session offer message 506 to determine the destination address that the conference controller 106 is to use for sending the media stream packets to the endpoints 102. In one embodiment, the session data processing module 402 of the conference controller 106 processes the received session offer message 506 and determines the unique SHARED-RELAY tag 216 and the relay candidate 312 from the received session offer message 506. Upon determination, for each unique SHARED-RELAY tag 216, the CC mapping module 404 generates a mapping between the relay candidate 312, the unique session identifier 212 and the IP address of the conference controller 106 and stores the mapping data in the memory 401. In one example, the IP address of the conference controller 106 may be the UDP/IP port that is allocated to transmit or receive the media packets from a corresponding port in the endpoints 102.

In another embodiment, the conference controller 106 may receive a plurality of session offer messages 506 from the endpoints 102 having the same relay candidate 312. The CC mapping module 404 generates a first mapping list by mapping all the endpoints 102 to the same relay candidate 312 and the IP address of the conference controller 106, and stores the first mapping list in the memory 401. In one example, the first mapping list is a list maintained for each session by the conference controller 106, comprising the unique session identifier 212, the IP address/Port number of the conference controller 106, the relay candidate 312, and one or more SHARED-RELAY tags 216 previously mapped with the list of the unique session identifier 212. In one example, if there are N sessions with N participants involved, each session will have the same first mapping list and the same unique session identifier 212. The syntax of the first mapping list is illustrated below:

{unique session identifier 212, IP address/Port number of the conference controller 106, relay candidate 312, list of SHARED-RELAY tag 216 Stag-1, . . . Stag-n}→list of Session context (S1 . . . Sn)

wherein Stag-1, . . . , Stag-n relates to SHARED-RELAY tag 216 of each Session offer message 506; S1, . . . Sn relates to a list of session context, each session context stores information related to the endpoints 102 of a session.

In one example, if there are 'N' endpoints in the conference session, and all the 'N' endpoints use the same relay candidate i.e., relay IP/port on the TURN server 104 and communicating with the same conference controller 106, then the conference controller 106 will be configured with 'N' sessions and maintain the first mapping list as listed below:
(unique session Identifier, Conference controller—Local IP/port 1, relay IP/port, shared tag Stag1)
(unique session Identifier, Conference controller—Local IP/port 2, relay IP/port, Stag2)
. . .
(unique session Identifier, Conference controller—Local IP/port-N, relay IP/port, StagN);

As illustrated above, there will be multiple such records (N records here), one for each endpoint. The relay candidate to which the conference controller will send media packets to, and will receive media packets and the unique session identifier from, will be same for all the endpoints 102.

Upon mapping, the session data processing module 402 sends a session response message 508 to the endpoints 102 comprising the IP address of the conference controller 106 mapped with the relay candidate 312. The above described mapping process continues for all endpoints 102 joining or leaving the media session based on the connectivity status of the endpoints 102. The CC mapping module 404 dynamically updates the first mapping list stored in the memory 401 for changes in the connectivity status of the endpoints 102. If all the endpoints 102 leave the session, the CC mapping module 404 frees the mapping of the relay candidate 312 and the IP address of the conference controller 106.

On receiving the session response message 508 from the conference controller 106, an endpoint 102 sends a create permission message 510 to the TURN server 104 to update the IP address of the corresponding conference controller 106 that is authorized to receive or send media stream packets from or to the TURN server 104. The TURN server 104 receives the create permission message 510 and maintains a mapping of data received in the create permission message 510, as illustrated below:
{Endpoint1 IP/port, Session-identifier, Relay IP/port, Conference controller IP/port 1}
{Endpoint2 IP/port, Session-identifier, Relay IP/port, Conference controller IP/port 2}
. . .
{Endpoint n IP/port, Session-identifier, Relay IP/port, Conference controller IP/port n}

As illustrated above, there will be multiple such records (N records here) one for each endpoint. The session-identifier and relay IP/port will be the same for all the endpoints 102. Furthermore, the TURN server 104 sends a permission response message 512 indicating the updating of the IP address of the conference controller 106 as the source address for receiving packets at the TURN server 104. Upon updating, the endpoints 102 allocate channels for sending and/or receiving media stream packets from the TURN server 104.

In one embodiment, the channel request module 230 of the endpoints 102 sends a channelbind request message 514 to the TURN server 104. In one example, the channelbind request message 514 comprises a unique channel number of the channel that may be bounded for media packet transmission. Upon receiving the channelbind request message 514, the TURN server 104 sends a channelbind response 516 to the endpoint 102 acknowledging the binding of the channel having the unique channel number for transmitting media stream packets in the session identified by the unique session identifier 212 and the relay candidate 312. Upon transmitting the channelbind response message 516 to the endpoint 102, the TURN server mapping module 318 of the TURN server 104 generates a second mapping list comprising a mapping of list of channel numbers allocated to each of the endpoints 102 with the relay candidate 312 as per RFC5766 and the unique session identifier 212, and stores the second mapping list as TURN server mapping data 316 in the memory 304. In one example, if there are 'n' channels mapped with the same relay candidate 312 for the endpoints 102, then the second mapping list is indexed by the IP addresses of the endpoints 102 and the unique session identifier 212. The syntax of the second mapping list is illustrated below:
{List of channel numbers, the unique session identifier 212, relay candidate 312}

Furthermore, the TURN server mapping module 324 of the TURN server 104 updates the second mapping list comprising the IP address of the conference controller 106, the relay candidate 312, the unique session identifier 212 and the list of channels indexed by the channel number and IP address of the conference controller 106 as per RFC5766. The TURN server mapping module 324 also stores the updated second mapping list as TURN server mapping data 316 in the memory 304. The syntax of the updated second mapping list is illustrated below:
{Unique session identifier 212, List of channels Channel-1, Channel-2, . . . Channel-N, IP address of the conference controller 106, relay candidate 312} indexed by {Channel number, IP address of the conference controller 106}

Figure 5B:
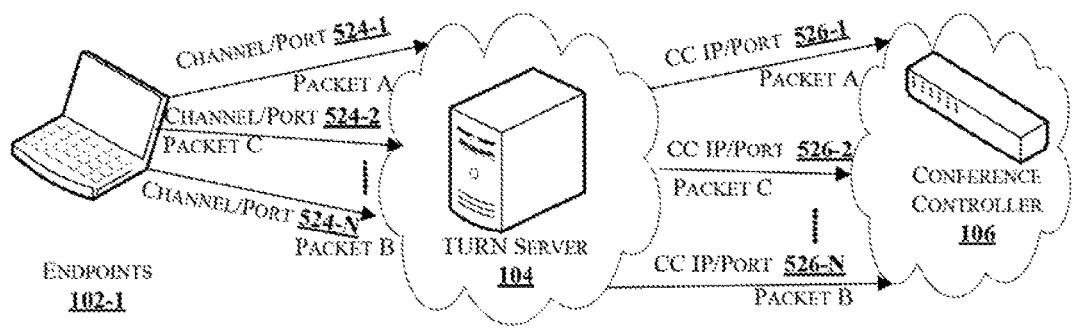
FIGS. 5b and 5c are simplified diagrams of media packet transmission between the endpoints and the conference controller in accordance with some embodiment of the present disclosure.

Upon completion of channel binding, the endpoints 102, the TURN server 104 and the conference controller 106 initiate the media packet transmission. In one embodiment, when an endpoint media streaming module 232 of an endpoint 102 transmits a media stream packet to the TURN server 104 through a previously allocated channel, the TURN server media streaming module 326 of the TURN server 104 determines the mapped IP address of the conference controller 106 and transmits the media stream packet to the corresponding conference controller 106. As illustrated in FIG. 5b, there are one or more channels allocated for each endpoint having one or more ports, for example Channel/port 524-1, 524-2, . . . 524-N and the conference controller 106 is also configured with one or more CC IP/port 526-1, 526-2, . . . 526-N etc. The TURN server 104 maintains the mapping of the channel/port of each endpoint with a corresponding CC IP/port allocated during the create Permission 510. In one example, if one endpoint 102-1 sends a media packet i.e., packet A on channel/port 524-1 to the TURN server 104, the TURN server 104 identifies the corresponding TURN server mapping data 316 and retrieves the IP address of the conference controller 106, and the port to which packet i.e., packet A is to be forwarded (i.e. CC IP/port 526-1 as illustrated). The TURN server 104 then sends the packet i.e., packet A to the identified IP address of the conference controller 106 and the port i.e., CC IP/port 526-1 that was created by the endpoint 102-1 in the create Permission 510.

Figure 5C:
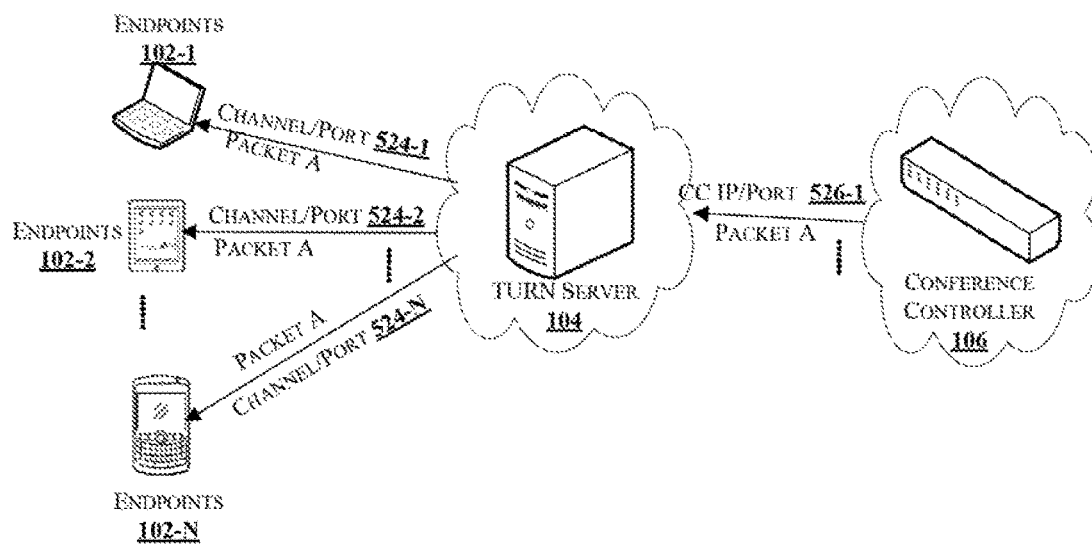

In another embodiment, when the conference controller 106 transmits the media stream packet to the TURN server 104, the CC media streaming module 406 transmits a single copy of the media stream packet to the TURN server 104 for relaying to the endpoints 102. As illustrated in FIG. 5c, the conference controller 106 may send the single copy of the media stream packet (for example, packet A) to the TURN server 104 via one of the conference controller ports CC IP/port 526-1, 526-2, . . . 526-N. The TURN server 104 receives the single copy of the media stream packet i.e., packet A from the conference controller 106 and determines the list of endpoints 102 that are mapped with the Source IP address from where the media stream packets was received. Upon determination, the TURN server 104 relays the media stream packet i.e., packet A to each of the retrieved endpoints 102 as illustrated in relay 520. In one implementation, the TURN server media streaming module 326 generates one copy of the media stream packet for each of the endpoints 102 mapped in the second mapping list and transmits the generated copy of the media stream packet i.e., packet A to each of the endpoints 102 through the channel having the channel number mapped in the second mapping list.

During the media session of exchange of the media stream packets between the endpoints 102 and the peers 112, the endpoints 102 refresh the relay candidate allocation 522. In one example, the endpoints 102 sends the relay allocation refresh requests to the TURN server 104. The TURN server 104 dynamically refreshes the relay transport address allocated to the endpoints 102 upon receiving a relay allocation refresh request. In another example, if the endpoints 102 do not send any relay allocation refresh requests to refresh the allocation, then the relay candidate 312 associated with the media session will expire and the second mapping list associated with the expired relay candidate is removed from the TURN server 104.

Figure 6:
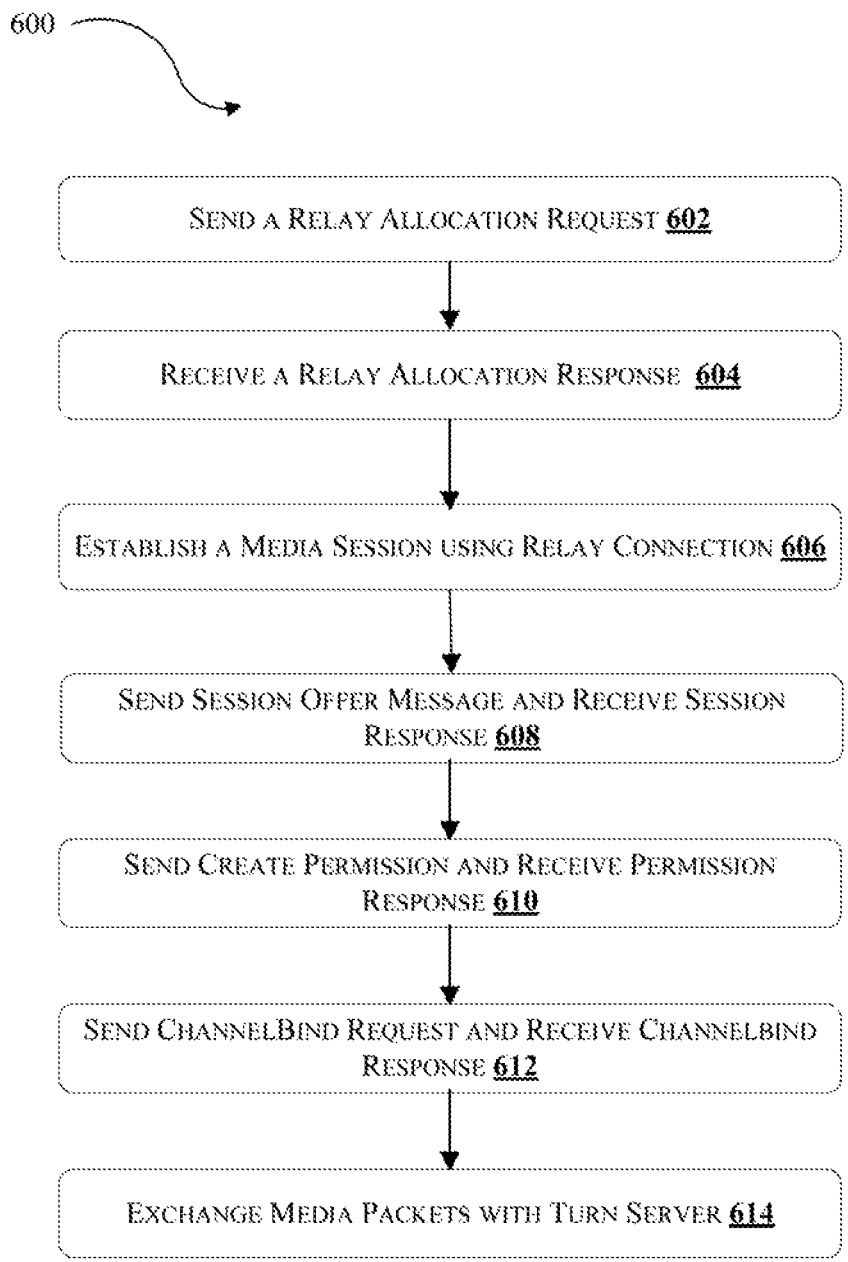
FIG. 6 is a simplified schematic diagram illustrating an exemplary flowchart for some embodiments of the present disclosure.

FIG. 6 is a simplified flowchart illustrating details related to certain activities of the endpoints 102 of the cloud conference system 100 in accordance with one embodiment of the present disclosure.

As illustrated in FIG. 6, the method 600 comprises one or more blocks implemented by the processor 202 for enabling media packet transmission during the conference session. The method 600 may be described in the general context of computer executable instructions. Generally, computer executable instructions can include routines, programs, objects, components, data structures, procedures, modules, and functions, which perform functions or implement abstract data types.

The order in which the method 600 is described is not intended to be construed as a limitation, and any number of the described method blocks can be combined in any order to implement the method 600. Additionally, individual blocks may be deleted from the method 600 without departing from the scope of the subject matter described herein. Furthermore, the method 600 can be implemented in any suitable hardware, software, firmware, or combination thereof.

At block 602, an endpoint sends a relay allocation request. In one embodiment, an endpoint 102 sends a TURN discovery request to the TURN server 104 and redirects the TURN discovery request to another alternate TURN server if the endpoint 102 receives an ALTERNATE-SERVER response from the TURN server 104. Once the endpoint 102 selects the appropriate TURN server 104, the endpoint 102 sends a relay allocate request message 214 to the TURN server 104. In one embodiment, the relay allocation request module 224 sends the relay allocate request message 214 to the TURN server 104. The relay allocate request message comprises the new attribute SESSION-IDENTIFIER that may be the conference identifier or the passcode or the unique session identifier 212 that identifies the conference session joined by the endpoint 102.

At block 604, the endpoint receives a relay allocation response. In one embodiment, the endpoint 102 receives a relay allocation response message 314 from the TURN server 104. The relay allocation response message 314 comprises the relay candidate 312 allocated to the endpoint 102 by the TURN server 104. In one implementation, the relay candidate 312 comprises a relay transport address that is used for exchange of media stream packets between the endpoint 102 and the conference controller 106.

At block 606, a media session is established using relay connection. In one embodiment, the endpoint 102 initiates call setup operations with the conference server 110. In one embodiment, the endpoint 102 sends a session initiation request 502 to the conference server 110 to initiate a session. The conference server 110 receives the session initiation request 502, creates a new media session in response to receiving the session initiation request 502 and assigns a unique session identifier to the session thus created. Upon creation of the new media session, the conference server 110 sends a session initiation confirmation message 504 to the endpoint 102. The endpoint 102 joins the session assigned with the unique session identifier or conference identifier 212. The unique session identifier may be, for example, an alphanumeric string like conf1243, a random string of numeric characters like 234 456 678, or strings like "Alice", "Smith" etc.

At block 608, a session offer message is sent and a session response message is received. In one embodiment, the endpoint 102 continues the call set up procedures by sending a session offer message 506 to the conference controller 106. In one embodiment, the endpoint's session initiation module 228 generates a session offer message 506 that includes one or more media streaming initializing parameters. In one example, the session offer message may be a Session Description Protocol (SDP) offer message with one or more attributes and the one or more media streaming initializing parameters include the relay candidate 312 and a new attribute such as SHARED-RELAY tag 216. The conference controller 106 receives at least one session offer message 506 and processes the session offer message 506 to determine the destination address that the conference controller 106 uses for sending the media stream packets to the endpoints 102. Based on the SHARED-RELAY tag in the session offer message 506, the conference controller 106 determines that a relay address is to be used as the destination address for transmission of the media stream packets to the endpoints 102. Also, the SHARED-RELAY tag 216 in the session offer message 506 is an indication to the conference server 110 that the endpoints 102 are grouped to the common TURN server 104 and the media packets are to be sent to the TURN server 104 for relaying to the endpoints 102.

In one embodiment, the session data processing module 402 of the conference controller 106 receives the session offer message 506 from the endpoint 102 and determines the relay candidate 312 from the received session offer message 506. Upon determination of the relay candidate 312 in the received session offer message 506, the CC mapping module 404 generates a mapping of the relay candidate 312, the unique session identifier 212 and IP address of the conference controller with the endpoint 102 and stores the mapping data in the memory 401. Upon mapping, the session data processing module 402 sends the session response message 508 to the endpoint 102 comprising the IP address of the conference controller 106 mapped with the relay candidate 312.

At block 610, a create permission message is sent and a receive permission response message is received. On receiving the session response message 508, the endpoint 102 sends a create permission message 510 to the TURN server 104 to update the IP address of the corresponding conference controller 106 that is authorized to receive or send media stream packets from or to the TURN server 104. The permission request message 510 comprises the IP address of the conference controller 106 that may be used as the source IP address of the media stream packets received from the peers 112. The endpoint 102 further receives a permission response message 512 indicating the updating of the IP address of the conference controller 106 as the source address for receiving packets at the TURN server 104. Upon updating, the endpoint 102 allocates channels for receiving media stream packets from the TURN server 104.

At block 612, a channelbind request message is sent and a channelbind response is received. In one embodiment, the channel request module 230 sends a channelbind request message 514 comprising a unique channel number of the channel that may be bounded for media packet transmission. In response, the endpoint 102 receives a channelbind response 516 from the TURN server 104 acknowledging the binding of the channel having the unique channel number for transmitting media stream packets in the session identified by the unique session identifier 212 and the relay candidate 312. Upon completion of channel binding, the endpoint 102, the TURN server 104 and the conference controller 106 initiate the media packet transmission.

At block 614, media packets are exchanged with the TURN server. In one embodiment, the endpoint's media streaming module 232 transmits a media stream packet 102 to the TURN server 104 through a previously allocated channel. The media streaming module 326 of the TURN server 104 determines the mapped IP address of the conference controller 106 and transmits the media stream packet to the corresponding conference controller 106.

Figure 7:
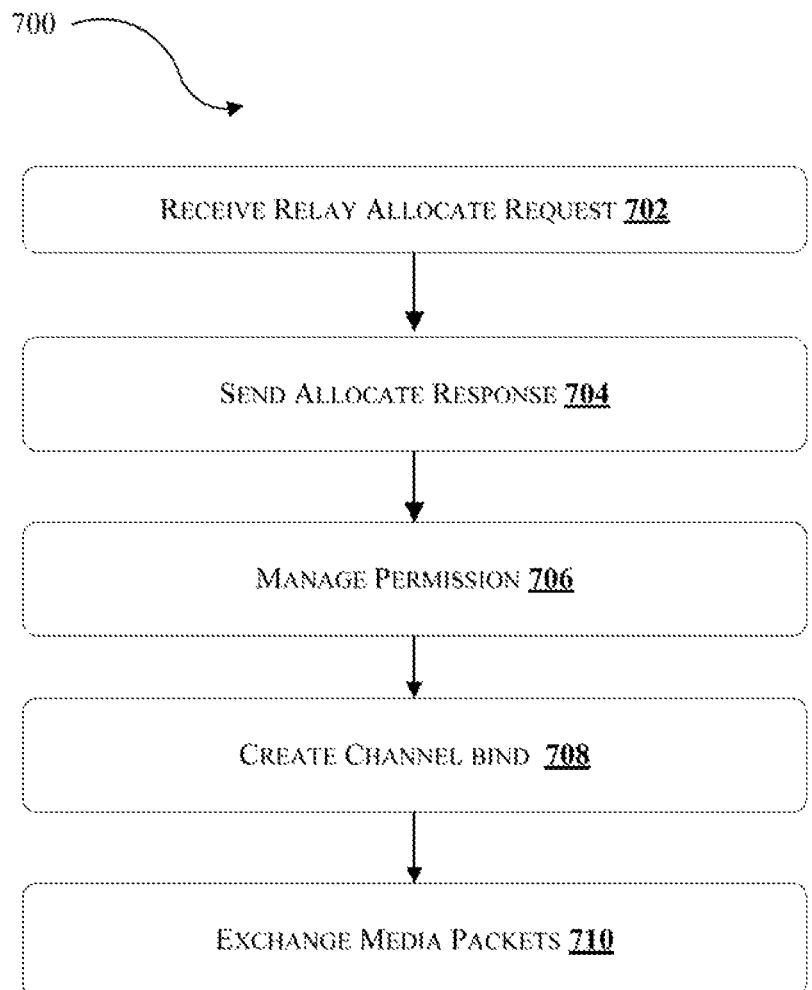
FIG. 7 is a simplified schematic diagram illustrating an exemplary flowchart illustrating details related to certain activities of the TURN server of the cloud conference in accordance with one embodiment of the present disclosure.

FIG. 7 is a simplified flowchart illustrating details related to certain activities of the TURN server 104 of the cloud conference in accordance with one embodiment of the present disclosure.

As illustrated in FIG. 7, the method 700 comprises one or more blocks implemented by the processor 302 for enabling media packet transmission during the conference session and media optimization. The method 700 may be described in the general context of computer executable instructions. Generally, computer executable instructions can include routines, programs, objects, components, data structures, procedures, modules, and functions, which perform particular functions or implement particular abstract data types.

The order in which the method 700 is described is not intended to be construed as a limitation, and any number of the described method blocks can be combined in any order to implement the method 700. Additionally, individual blocks may be deleted from the method 700 without departing from the spirit and scope of the subject matter described herein. Furthermore, the method 700 can be implemented in any suitable hardware, software, firmware, or combination thereof.

At block 702, a relay allocate request is received. In one embodiment, the TURN server 104 receives the relay allocate request message 214 comprising the unique session identifier 212 and allocates a relay candidate 312 to an endpoint 102 requesting the same. In one embodiment, the relay allocation response module 322 receives the relay allocate request message 214 from an endpoint 102 and determines whether any relay candidate allocation already exists for the requested session having the unique session identifier 212 in the new attribute SESSION-IDENTIFIER.

At block 704, an allocate response is sent. In one embodiment, if the relay allocation response module 322 determines an existing relay candidate allocation, then the relay allocation response module 322 sends the relay allocate response 314 with the existing relay candidate to the endpoint 102. In another example, if the relay allocation response module 322 determines non-allocation for the unique session identifier 212 in the attribute SESSION-IDENTIFIER, then the relay allocation response module 322 determines the relay candidate 312 and transmits the relay allocate response 314 with the relay candidate 312 thus determined. In one implementation, the relay candidate 312 comprises a relay transport address that is used for exchange of media stream packets between the endpoint 102 and the conference controller 106.

In a second embodiment, the TURN server 104 receives the relay allocate request message 214 without the unique session identifier 212. On determination of non-allocation of the relay candidate 312 to the endpoint 102, the relay allocation response module 322 determines the relay candidate 312 and allocates the relay candidate 312 to the endpoint 102 requesting the same. The TURN server 104 transmits the relay allocate response message 314 comprising the relay candidate 312 i.e., the relay transport address that may be used for exchanging the media stream packets between the endpoint 102 and the conference controller 106. Upon sending the relay allocation response message 314 to the endpoint 102, the TURN server mapping module 324 maps the relay candidate 312 with the unique session identifier 212 and stores the mapped data as TURN server mapping data 316.

At block 706, permissions are managed. In one embodiment, the TURN server 104 receives a create permission request 510 from the endpoint 102 to update the IP address of the corresponding conference controller 106 sending the session response message 508. The create permission message 510 comprises the IP address of the conference controller 106 that may be used as the source IP address of the media stream packets received from the peers 112. The TURN server 104 receives the permission request message 510 and updates the IP address of the conference controller 106 as the source IP address of the media stream packets received from the peers 112. Upon updating, the TURN server 104 sends a permission response message 512 indicating the updating of the IP address of the conference controller 106. Further, the endpoint 102 allocates channels for receiving media stream packets from the TURN server 104.

At block 708, channelbind is created. In one embodiment, the TURN server 104 receives the channelbind request message 514 from the endpoint 102 and determines an unused channel for allocating to the endpoint 102. The TURN server 104 determines channel information 319 such as unique channel number associated with the unused channel and sends a channelbind response 516 comprising the unique channel number allocated to the endpoint 102.

In another embodiment, the TURN server 104 receives the channelbind request message 514 comprising a unique channel number of the channel that may be bounded for media packet transmission. Upon receiving the channelbind request message 514, the TURN server 102 determines the validity of the request and sends a channelbind response 516 to the endpoint 102 acknowledging the binding of the channel having the unique channel number for transmitting media stream packets in the session identified by the unique session identifier 212 and the relay candidate 312. Upon transmitting the channelbind response message 516 to the endpoint 102, the TURN server mapping module 318 of the TURN server 104 generates a second mapping list comprising the unique channel number mapped with the relay candidate 312 and the unique session identifier 212 and stores the second mapping list as TURN server mapping data 316 in the memory 304. Furthermore, the TURN server mapping module 324 of the TURN server 104 updates the second mapping list comprising IP address of the conference controller 106, the relay candidate 312, identifier of the endpoint 102 and list of channels indexed by the channel number and IP address of the conference controller 106. The TURN server mapping module 324 also stores the updated second mapping list as TURN server mapping data 316 in the memory 304. Upon completion of channel binding, the endpoint 102, the TURN server 104 and the conference controller 106 initiate the media packet transmission.

At block 710, media packets are exchanged. In one embodiment, the TURN server 104 receives the media stream packet from the endpoint 102, the TURN server media streaming module 326 of the TURN server 104 determines the mapped IP address of the conference controller 106 and transmits the media stream packet to the corresponding conference controller 106.

In another embodiment, when the conference controller 106 transmits the media stream packet to the TURN server 104, the TURN server 104 receives a single copy of the media stream packet from the conference controller 106 for relaying to the endpoint 102. Upon receiving the single copy of the media stream packet, the TURN server 104 validates the IP address of the conference controller 106 as the valid Source IP address for receiving the media stream packet. In one implementation, the media streaming module 326 determines as to whether the IP address of the conference controller 106 is a previously validated Source IP address that has valid permissions to transmit the media stream packet at the relay transport address specified in the relay candidate 312. Upon determination, the TURN server media streaming module 326 retrieves the list of endpoints 102 that are mapped with the validated Source IP address, and relays the media stream packet to each of the retrieved endpoints 102. In one implementation, the TURN server media streaming module 326 generates one copy of the media stream packet for each of the endpoints 102 mapped in the second mapping list and transmits the generated copy of the media stream packet to each of the endpoints 102 through the channel having the channel number mapped in the second mapping list.

During the media session of exchange of the media stream packets between the endpoints 102 and the peers 112, the endpoints 102 refresh the relay candidate allocation 522. In one example, if the endpoints 102 do not refresh the allocation, then the relay candidate 312 associated with the media session will expire and the second mapping list associated with the expired relay candidate is removed from the TURN server 104.

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

Furthermore, one or more computer-readable storage media may be utilized in implementing some of the embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The present disclosure provides methods and systems for effectively utilizing available bandwidth between the conference controller and the network by exchanging a single media stream between the conference controller and the TURN server instead of exchanging multiple streams with each endpoint. This is especially helpful in cases where a larger number of endpoints join the conference session leading to huge consumption of available bandwidth on the access link.

Further, the above disclosed mechanisms can be implemented with endpoints that use multiple encoded streams. In one example, if an endpoint requests a multiple encoding of the media packets that are transmitted from the conference controller, the conference controller will encode the media packets and send encoded media packets to the TURN server as a simulcast stream with multiple encoding for each stream. The TURN server in turn will relay the encoded media packets to the endpoints. In another example, the TURN server can include a module that processes a Real-Time Transport Protocol (RTP) header for encoding requirements before relaying the media packets to the endpoints.

Furthermore, the above disclosed mechanism may be dynamically invoked by a conference server depending on the bandwidth on the access link. In another aspect, the bandwidth available between the conference controller and the TURN server is determined by a mechanism like PCP-FLOWDATA or a mechanism mentioned in U.S. application Ser. No. 14/476,336 and Publication no: 20160065476, the disclosures of which are incorporated herein by reference, that can be used by the conference controller to learn the available bandwidth. If the bandwidth between the conference controller and the cloud network deteriorates, then the conference controller can invoke the above disclosed mechanism and all the endpoints that are communicatively coupled with the conference controller having the same unique session identifier can therefore use the same TURN server or participate in the same relay session.

Furthermore, the conference mixer can scale up with more endpoints participating in the media session without having additional instances of the conference controller thereby avoiding additional cost and increased delay caused in multiple hops of the media stream between the conference controller and the endpoints.

The illustrated steps are set out to explain the exemplary embodiments shown, and it should be anticipated that ongoing technological development will change the way particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. An endpoint operable with a network device and a conference controller, the endpoint comprising:
   a processor; and
   a memory communicatively coupled to the processor, wherein the memory stores processor-executable instructions, which, on execution, cause the processor to:
      send a relay address allocation request comprising a unique session identifier to the network device, wherein the unique session identifier identifies a conference session joined by the endpoint for media streaming;
      receive a relay address allocation response from the network device in response to sending the relay address allocation request, wherein the relay address allocation response comprises at least a relay candidate that includes a relay transport address allocated to the endpoint and is mapped with the unique session identifier;
      send a session offer message to the conference controller, wherein the session offer message comprises at least the relay transport address to be used as a destination address for the endpoint;
      receive a session response message from the conference controller in response to sending the session offer message, wherein the session response message comprises an IP address of the conference controller mapped with the relay candidate;
      send a create permission request to the network device, wherein the create permission request comprises the IP address of the conference controller as source address for receiving the one or more media stream packets by the network device;
      receive a permission response from the network device confirming the validity of the IP address of the conference controller as source IP address;
      send a channelbind request to the network device, wherein the channelbind request comprises a unique channel number of a channel available for binding;
      receive a channelbind response from the network device indicating binding of the channel having the unique channel number for receiving the one or more media stream packets from the network device; and
      receive one or more media stream packets relayed from the network device via the destination address identified by the unique session identifier.

2. The endpoint as claimed in claim 1, wherein prior to sending the session offer message, the processor is configured to:
   generate the session offer message comprising one or more session initialization parameters and the relay candidate for media streaming; and
   add a shared-relay tag to the relay candidate in the session offer message.

3. The endpoint as claimed in claim 1, wherein the processor is further configured to send the one or more media stream packets to the conference controller via the network device through the allocated channel having the unique channel number.

4. The endpoint as claimed in claim 1, wherein the relay address allocation request comprises a time-to-expiry value, and wherein the processor is further configured to:
   dynamically send a relay allocation refresh request to the network device for refreshing the relay transport address allocated to the endpoint based on the time-to-expiry value.

5. A network device operable with one or more endpoints and a conference controller, the network device comprising:
   a processor; and
   a memory communicatively coupled to the processor, wherein the memory stores processor-executable instructions, which, on execution, cause the processor to:
      receive a relay address allocation request comprising a unique session identifier from an endpoint of the one or more endpoints, wherein the unique session identifier identifies a conference session joined by the endpoint for media streaming;
      determine a relay candidate comprising a relay transport address for allocating to each of the one or more endpoints of the conference session having the unique session identifier;
      map the relay candidate with the unique session identifier;
      send a relay address allocation response to the one or more endpoints sending the relay address allocation request, wherein the relay address allocation response comprises at least the relay candidate mapped with the unique session identifier;
      receive a create permission request comprising IP address of a conference controller as source address for receiving the one or more media stream packets by the network device;
      send a permission response confirming the validity of the IP address of the conference controller as source address;
      receive a channelbind request comprising a unique channel number of a channel available for binding;
      send a channelbind response indicating binding of the channel having the unique channel number for receiving the one or more media stream packets from the network device; and
      receive a single copy of the one or more media stream packets from the conference controller and relay the one or more media stream packets via the relay transport address identified by the unique session identifier to each of the one or more endpoints in the session having the unique session identifier.

6. The network device as claimed in claim 5, wherein the processor is configured to:
   generate a first mapping list comprising at least the unique session identifier of the one or more endpoints mapped with the relay candidate, IP address of the conference controller and one or more shared-relay tags associated with a session offer message, wherein the IP address of the conference controller is verified as a source address for receiving the one or more media stream packets by the network device; and updating the first mapping list based on a connection status of each of the one or more endpoints associated with the relay candidate.

7. The network device as claimed in claim 6, wherein upon generating the first mapping list, the processor is further configured to:

generate a second mapping list comprising at least the unique channel number of the available channel mapped with the IP address of conference controller, the relay candidate and the unique session identifier associated with each of the one or more endpoints allocated with the unique channel number indexed by the unique channel number and the IP address of the conference controller.

8. The network device as claimed in claim 5, wherein the processor is further configured to send one or more media stream packets received from the one or more endpoints to the conference controller using the relay transport address.

9. The network device as claimed in claim 5, wherein the relay address allocation request comprises a time-to-expiry value, and wherein the processor is further configured to:

receive a relay allocation refresh request from the endpoint of the one or more endpoints; and dynamically refresh the relay transport address allocated to the endpoint based on the time-to-expiry value.

10. The network device as claimed in claim 9, wherein the processor is configured to receive one or more media stream packets encoded by the conference controller and relay each copy of one or more encoded media stream packets to each endpoint of the one or more endpoints.

11. The network device as claimed in claim 5, wherein said network device comprises a Traversal Using Relays around Network Address Translator (TURN) server.

12. A method comprising:

establishing, by a network device, a media session with a conference controller and one or more endpoints;

receiving by the network device, a relay address allocation request from an endpoint of the one or more endpoints, the relay address allocation request comprising a unique session identifier that identifies a conference session joined by the endpoint for media streaming;

determining by the network device, a relay candidate comprising a relay transport address for allocating to each of the one or more endpoints of the conference session having the unique session identifier;

mapping by the network device, the relay candidate with the unique session identifier;

sending by the network device, a relay address allocation response to the one or more endpoints in response to sending the relay address allocation request, wherein the relay address allocation response comprises at least the relay candidate mapped with the unique session identifier;

receiving a session response message comprising an IP address of the conference controller mapped with the relay candidate;

receiving a create permission request comprising the IP address of the conference controller as source address for receiving the one or more media stream packets by the network device;

sending a permission response to the one or more endpoints confirming the validity of the IP address of the conference controller as source address for receiving the one or more media stream packets;

receiving a channelbind request comprising a unique channel number of a channel available for binding; and sending a channelbind response indicating binding of the channel having the unique channel number for receiving the one or more media stream packets from the network device; and receiving a single copy of the one or more media stream packets from the conference controller and relaying the one or more received media stream packets via the relay transport address to each of the one or more endpoints of the session having the unique session identifier.

13. The method as claimed in claim 12, wherein the method further comprising steps of:

generating a first mapping list, wherein the first mapping list comprises at least the unique session identifier of the one or more endpoints sending a session offer message mapped with the corresponding relay candidate, the IP address of the conference controller and one or more shared-relay tag associated with the session offer message; and updating the first mapping list based on connection status of each of the one or more endpoints associated with the relay candidate.

14. The method as claimed in claim 13, wherein upon generating the first mapping list, the method comprises the steps of:

generating a second mapping list comprising at least unique channel number of the available channel, mapped with IP address of conference controller, the relay candidate and the unique session identifier associated with each endpoint allocated with the unique channel number indexed by the unique channel number and the IP address of the conference controller.

15. The method as claimed in claim 14, wherein the method further comprising steps of:

receiving the one or more media stream packets from the one or more endpoints through the channel having the unique channel number;

determining the IP address of the conference controller mapped with the unique channel number and relay candidate in the second mapping list; and relaying the one or more media stream packets to the IP address of the conference controller thus determined.

16. The method as claimed in claim 12, wherein the relay address allocation response comprises at least the relay candidate including the relay transport address allocated to each endpoint and the unique session identifier determined in response to receiving the relay address allocation request.

17. The method as claimed in claim 12, wherein the relay address allocation request comprises a time-to-expiry value, and wherein the method further comprises:

receiving a relay allocation refresh request from the endpoint of the one or more endpoints; and dynamically refreshing the relay transport address allocated to the endpoint based on the time-to-expiry value.

18. The method as claimed in claim 12, wherein the method further comprising step of receiving one or more media stream packets encoded by the conference controller and relaying each copy of one or more encoded media stream packets to each endpoint of the one or more endpoints.

19. The method as claimed in claim 12, wherein the network device comprises a Traversal Using Relays around Network Address Translator (TURN) server.

* * * * *